United States Patent [19]

Bullis et al.

[11] 4,308,455
[45] Dec. 29, 1981

[54] METHOD FOR DECODING BAR-CODED LABELS

[75] Inventors: David C. Bullis, Fort Collins, Colo.; Alan G. Montross, Newark, Del.

[73] Assignee: E. I. Du Pont de Nemours and Company, Wilmington, Del.

[21] Appl. No.: 163,099

[22] Filed: Jun. 26, 1980

[51] Int. Cl.³ .......................... G06K 7/14; G08C 9/06
[52] U.S. Cl. .............................. 235/463; 340/146.3 Z
[58] Field of Search ............. 235/437, 449, 462, 463, 235/466, 474, 493, 494; 360/40; 371/1, 2, 6, 36, 41, 52; 340/146.3 K, 146.3 Z, 146.3 A, 146.3 C, 146.3 S, 146.3 T, 146.3 Y; 250/555, 556, 557, 558

[56] References Cited

U.S. PATENT DOCUMENTS

| | | |
|---|---|---|
| Re. 28,198 | 10/1974 | Dobras . |
| 3,553,437 | 1/1971 | Boothroyd . |
| 3,778,597 | 12/1973 | Vanderpool et al. . |
| 3,792,236 | 2/1974 | Dobras et al. . |
| 3,811,033 | 5/1974 | Herrin et al. . |
| 3,838,251 | 9/1974 | Herrin . |
| 3,854,036 | 12/1974 | Gupta et al. . |
| 3,868,634 | 2/1975 | Dolch . |
| 3,882,464 | 5/1975 | Zamkow . |
| 3,886,521 | 5/1975 | Dobras . |
| 3,887,792 | 6/1975 | Williams . |
| 3,891,831 | 6/1975 | Coles, Jr. . |
| 3,906,203 | 9/1975 | Butulis . |
| 4,012,716 | 3/1977 | Herrin . |
| 4,058,708 | 11/1977 | Sherer et al. . |
| 4,059,224 | 11/1977 | Seligman . |
| 4,146,046 | 3/1979 | Dobras . |
| 4,147,295 | 4/1979 | Nojiri et al. . |
| 4,158,435 | 6/1979 | Nakanishi et al. . |
| 4,175,693 | 11/1979 | Nakanishi et al. .................. 235/463 |

*Primary Examiner*—Thomas A. Robinson

[57] ABSTRACT

A method for reading bar-coded labels by taking ratios of successive bars and spaces, then discriminating and categorizing the ratios of one of four possibilities. This output is combined and decoded into characters using a read-only-memory. The characters along with information on spacing between the characters is then passed to a microprocessor. The microprocessor decides which of the characters are valid and assembles a complete scans worth of information by making use of the data relating to the separation between characters. Handling the data in this fashion provides a means to assemble data from partial scans of the label into one complete scan.

3 Claims, 14 Drawing Figures

(START)...1̲0 10 0̲1 01 0̲1   1̲1 1̲0 11   0̲1 10 1̲0 1̲0 0̲1   01 0̲0...(STOP)

FIRST CHARACTER — INTERCHARACTER SPACE — SECOND CHARACTER

FIG. 2B

| | FIRST CHARACTER | | | INTERCHARACTER SPACE | | SECOND CHARACTER | | | | |
|---|---|---|---|---|---|---|---|---|---|---|
| 1........ | | | 0̲1 | 0̲1 | 1̲1 | 1̲1 | 0̲1 | 1̲0 | 0̲1 | 01 0̲1...(STOP) |
| 2........ | .1̲1 1̲1 | 0̲1 | 1̲1 | 1̲0 | 1̲1 | 0̲0 | 1̲0 | 0̲0 | 0̲1 | 01 0̲1...(STOP) |
| 3........ | 1̲0 1̲0 | 0̲1 | 0̲1 | 0̲0 | 1̲1 | 1̲1 | 1̲0 | 1̲0 | 0̲1 | 01 0̲0 |
| 4 (START).. 1̲0 | 1̲0 1̲0 | 0̲1 | 0̲1 | 1̲1 | 1̲1 | 1̲0 | 1̲0 | 1̲0 | 0̲1 | |
| 5 (START).. 1̲0 | 1̲0 1̲0 | 0̲1 | 0̲1 | 1̲1 | | 1̲1 | 1̲0 | | | |

SCAN (1), SCAN (2), SCAN (3), SCAN (4), SCAN (5)

CRACK, MISPRINT, SMEAR

METHOD FOR DECODING BAR-CODED LABELS

BACKGROUND OF THE INVENTION

This invention relates to reading and decoding bar-coded labels having such formats as "CODABAR" which is a trademark of Monarch Marking Systems, Inc. or "CODE 39" which is a registered trademark of Interface Mechanisms, Inc. More particularly, the invention relates to electronic circuitry associated with a label reader scanning system for processing signals generated by such scanning systems.

A "CODABAR" coded character is an ordered arrangement of four bars and three spaces. With the exception of the widths of the bars and spaces associated with the "START" and "STOP" codes, each bar and space in the coded character has a width defined by one of two fixed standard values. An intercharacter space, used to separate one coded character from the next, may have a width similar to a standard width. In this event, it is likely that a false character identification will be generated based upon the read portions of the two adjacent characters with the intercharacter space in between.

To avoid this problem, most prior art "CODABAR" systems have been designed to use a count-of-four bars to determine whether the character data is complete before an attempt is made to decode the corresponding data. However, a shortcoming of this method is that should a scan fail to detect a bar in any given character for any reason, the reader will try to decode that character based upon the interval comprising the three bars it did detect plus the first bar from the next character representation along with the intercharacter space. A false character decode usually results, with the remaining characters in the string equally likely to be misread since the bar count becomes unsynchronized with the scan across each succeeding coded character. It has been determined experimentally for the characters in the set that such a decoding scheme misreads a false character 20% to 50% of the time. This factor alone usually demands interruption of the label reading procedure.

Techniques for determining the comparative sizes of adjacent bars and spaces and assignment of binary codes to the outcome of these comparisons for generating message binary data strings are known in the art. For example, see U.S. Pat. Nos. 3,778,597, 3,854,036, 3,906,203 and 4,012,716. More specifically, U.S. Pat. Nos. 3,854,036 and 3,887,792 detail means for converting the widths of scanned bars and spaces into logarithmic form in order to extend the dynamic range of label reading speeds and, in addition, to facilitate calculating the log ratios of adjacent bars and/or spaces. U.S. Pat. No. 3,868,634 discloses a method and apparatus for reading damaged or skewed labels. U.S. Pat. Nos. 3,778,597 and 4,012,716 show error-detection schemes which serve only to delete entire character strings based upon an erroneous decode of a single character in a particular data stream.

Apparatus for decoding binary coded data streams using shift registers and decoders to generate a sequence of identified characters corresponding to the bar-space patterns appearing in any given scan across the label is also well known in the patent art (see U.S. Pat. Nos. 3,868,634 and 3,906,203).

In contrast, the system of the instant invention provides a means for using the bar count corresponding to the number of bars which have been scanned since the last character was decoded (either valid or false), and a ROM (read only memory) to continuously correlate the resultant stream of data bits with their respective ASCII character representations. If the number of bars measured since the last character decode is less than four and a decode is possible for the scanned bar-space array, the bar count is sent to a computer together with a quasi-identification of the decoded character. Should a count of greater than four be generated after the last identified or quasi-identified character, the instant quasi-identified character is discarded. In this manner, the computer can detect the occurrence of false character decodes spanning the bar-space patterns of two or more characters but still allows the character string decoding to proceed to the end of the label without interruption. Finally, the invention provides computer means to assemble each scan's string of identified or quasi-identified characters on a scan-by-scan basis over a sequence of scans in accordance with at least one of their respective start-stop (or stop-start) codes and/or control character such that defective or skewed labels can be read. An intermediately located control character(s) can be used to facilitate reading long labels which are canted with respect to the scan direction (that is, when neither start nor stop characters can be read on a single scan).

SUMMARY OF THE INVENTION

A method for decoding bar-coded labels comprising: computing separate ratios between adjacent bars and between adjacent spaces from an input data stream of alternate bars and spaces; assigning a two-bit binary code to each computed ratio in order to classify it as a greater than, less than, equal to or erroneous relation; decoding the resultant string of binary bits of the classified ratios into corresponding tentative character identifications using associated bar count data; and assembling the tentative character identifications into a most likely to have occurred character set.

Computing separate ratios comprises counting successive bar (or space) widths then converting count values into log values instantaneously and finally subtracting successive derived log values of the adjacent bars (or spaces) to obtain the ratios. Assigning a two-bit binary code to each computed ratio involves comparing the ratio values with predetermined limits and assigning two-bit value weights of 10 for ratios greater than 1, of 01 for ratios less than 1, of 00 for ratios of 1, and of 11 for an erroneous ratio.

DETAILED DESCRIPTION OF THE PREFERRED EMBODIMENT

Figure 1:
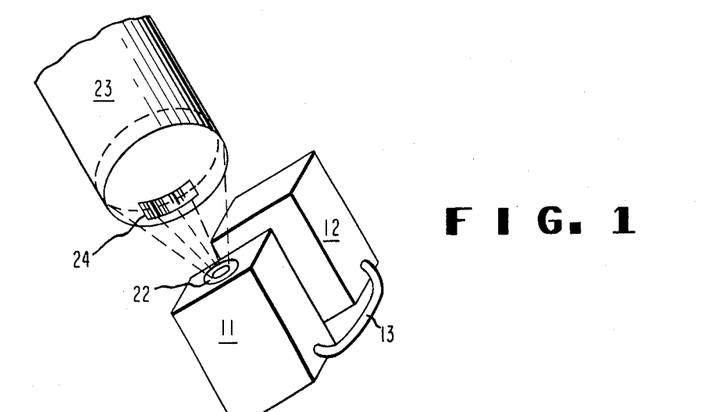
FIG. 1 is a perspective schematic view of a scanning apparatus connected to a decoder as used to read a label inside a yarn tube.

Referring to FIG. 1 the apparatus generally includes an optics unit 11, connected to a decoding unit 12 via cable 13. The optics unit is shown in position to scan through window 22 an open ended tube 23 having a bar coded label 24 adhered to its inner surface.

Figure 2A:
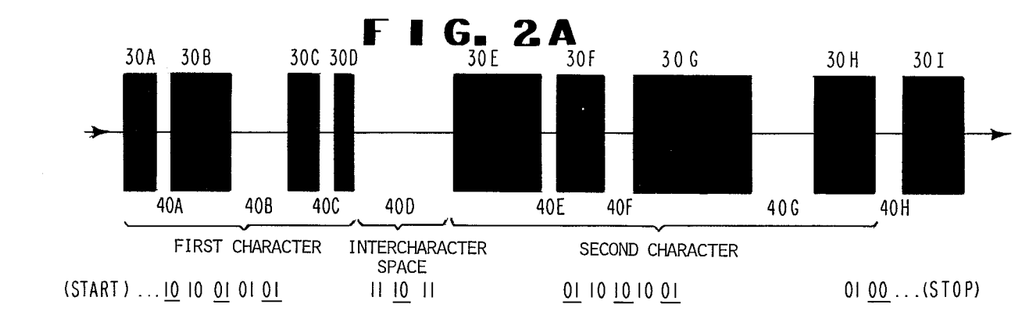
FIGS. 2A and 2B represent an unblemished and a damaged and blemished label, respectively.

FIG. 2A illustrates a portion of a typical unblemished "CODABAR" coded label symbolizing two characters and a portion of a third. Bars 30A through 30I are formed by printing a substantially nonreflective material, such as black ink, on the reflective surface of the label so that the areas 40A through 40H comprise the light reflective portions (or spaces).

"CODABAR" coded labels require that each coded-character comprise four bars and three spaces and that each bar or space have a wide or narrow width defined by two fixed standard values. These standard values must have a wide to narrow width ratio of at least 1.6 to 1.0. On the other hand, intercharacter spaces may be of any width provided its length is less than the end of the label count (approx. 50 μsec). The start and stop codes (not shown), which set out the beginning and end of the message respectively, comprise nonstandard bar and space widths to make their representation distinctive from the other encoded characters. Since encoding is accomplished by relative width modulation, the narrow and wide widths need not have rigidly fixed values between characters or even within the same character code so long as the ratio values conform with the encoding criteria.

To illustrate the width decoding of the instant invention, the encoded binary digits resulting from a left to right scan of the character string of FIG. 2A is as shown. Comparison of bar 30B with bar 30A shows a greater-than relationship and the reader assigns a 10 value. The reader next compares space 40B with space 40A and again recognizes the wide-narrow relationship and assigns a 10 value and so forth for the remainder of the scan. The use of a two-bit code, in contrast to a one-bit code, enables the decoder to immediately determine erroneous width measurements and thus generate an invalid character representation as these occur, without the need for a parity character.

Figure 2B:
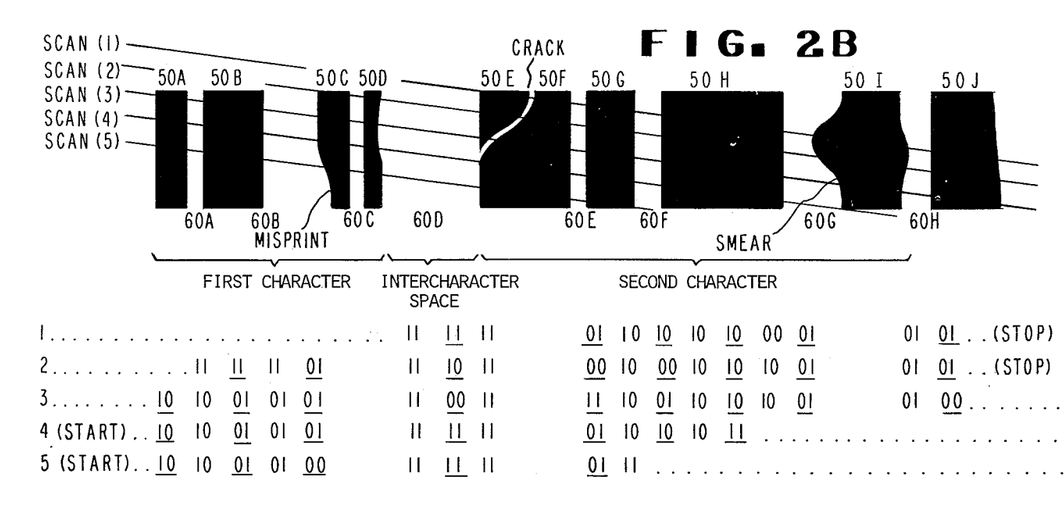

FIG. 2B shows a series of scans across a canted, damaged and misprinted label that is intended to be identical to the one of FIG. 2A. However, the binary data results for these scans in comparison with those of FIG. 2A are distinctively different since the effects of torn, smeared and misspaced character codes appear therein. Prior art label readers use the bar count ("CODABAR"=4) of each character independently as the primary criterion to determine whether a character has been read properly. As a result, with these systems, a real likelihood exists that defective labels or incompletely scanned ones will be misread.

FIG. 2B also shows that smudges, smears and misprints can distort a bar-coded character in such a way that to the scanning beam, a narrow bar will appear as a wide one and a wide space will appear as a narrow one. Furthermore, scans across a cracked label will generate extraneous bar and space data which would cause a miscount of legitimate character bars and spaces. Finally, prior art readers are normally designed to disregard scan data that does not contain both start and stop characters when scanning skewed labels. Consequently, it is not likely that the label of FIG. 2B would be successfully decoded by these readers, since none of the scans cross both start/stop characters on the same pass.

As is typical in the art, the signal generated by an optical linear scan of a bar coded label is converted to a stream of binary pulses by a discriminator circuit in such a way that a zero-volt output signal level corresponds to white spaces and a +2 volt level to the black bars, and the respective durations of the pulse signals are proportional to the spatial widths of the bars and spaces in the scan direction.

Figure 3:
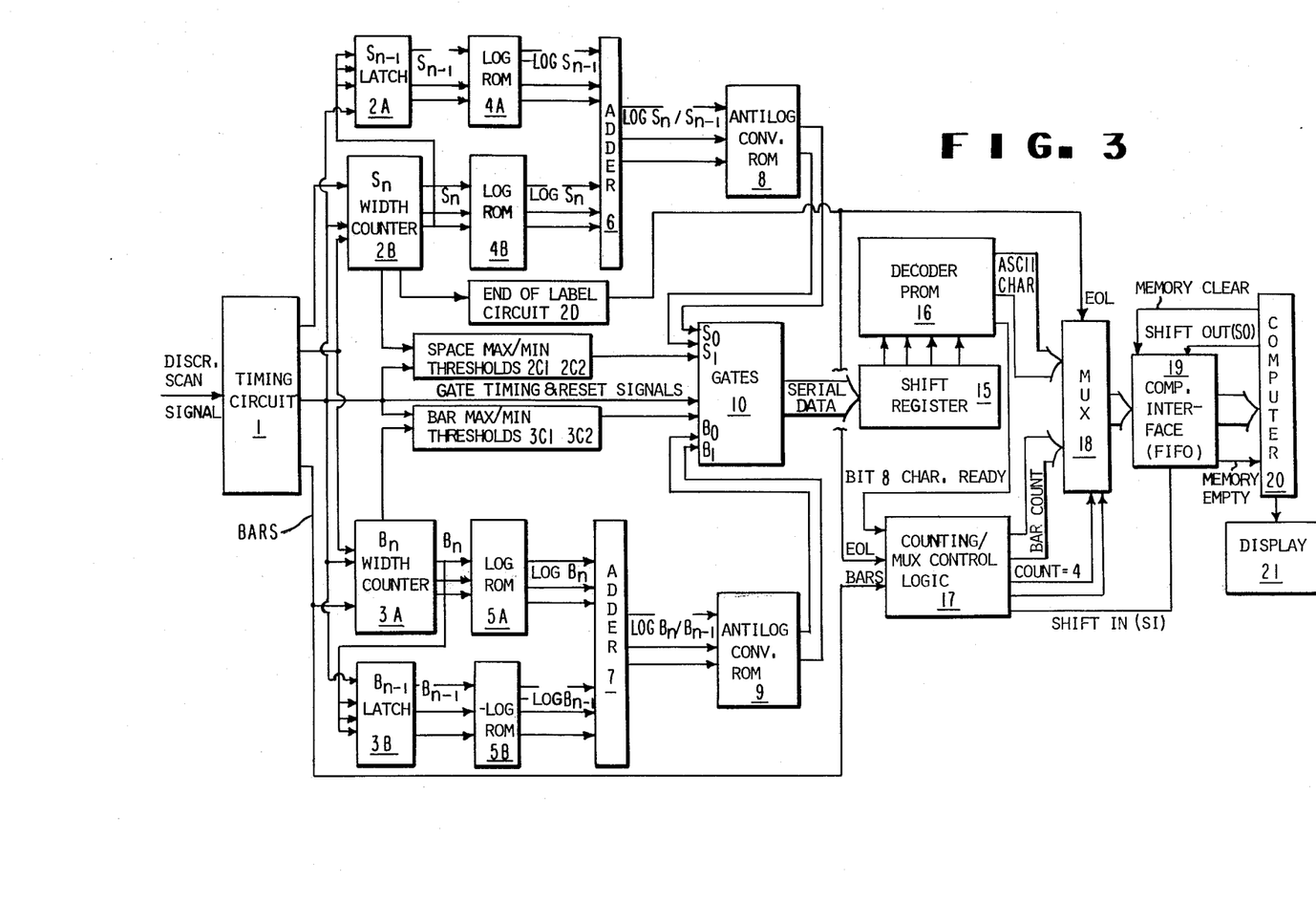
FIG. 3 is a block diagram of the basic label reading system of the invention showing data flow.

Turning to FIG. 3, which is a block diagram of the label reader of this invention, the discriminator output signal is transmitted to timing circuit 1 which operates to generate separate bar and space signals from the input data stream and produce clock, timing and gating signals needed to synchronize the transfer of data through the reader and measure pulse durations, respectively.

The decoding of the label data is accomplished partly in hardware logic by shift register 15 and PROM 16 and the remainder by computer 20. The hardwired portion handles the data as it is received, decodes it into quasi-identified characters, and then transfers the data through a first-in first-out (FIFO) memory 19 to the computer 20 at a rate of 250 scans/sec. The high speed operation and capacity of FIFO memory 19 enables this element to operate asynchronously with computer 20 and to serve as a data buffer to match the higher speed data generation of the decoder with the slower speed data processing computer. These circuits are detailed in FIGS. 4 and 4A through 4D.

Decoding of the digital data into ASCII characters by PROM 16 is continuous regardless of errors. Should an error be detected in one of the characters of the data stream, that is, should a decode be based on a bar count greater than 4 for "CODABAR" (or greater than 5 for code 39), that character is rejected; however, in spite of this rejection, the remaining portions of the label are still decoded and stored just as if the bar-count of 4 criterion had been met.

The width (duration) of each individual bar and space pulse signal is measured by counting the number of digital clock pulses that occur in these intervals by digital bar and space counters 3A and 2B, respectively. In this invention, a 10 MHz clock is used for 10 char./in. scan rates, but for lower rates, a corresponding lower oscillator frequency may be used to prevent overrunning the dynamic range of the counters. The counts are then latched into digital latches 3B and 2A, respectively, to form addresses for a first set of ROM's 5B and 4A. This set of ROM's is programmed to yield the 2's complement value of the log of their respective address inputs. The next successive bar or space is measured and becomes an address for the second set of ROM's 5A and 4B, respectively. The log data from ROM's 4A and 4B are added by digital adder 6 to form a log ratio of the values of the widths of the most current space to that of the just measured space. In a similar fashion the log ratio of the width of the most current bar to that of the just measured bar is determined by ROM's 5A and 5B and adder 7. ROM's 8 and 9 take the anti-logs of the data generated by adders 6 and 7, respectively, and on the basis of these conversions, decide which of the two bit binary codes to assign to the measured bar or space width ratio values, in accordance with the following table:

| Measured | Bit Value | |
|---|---|---|
| Ratio | $B_0(S_0)$ | $B_1(S_1)$ |
| 1/1 | 0 | 0 |
| ½ | 1 | 0 |
| 2/1 | 0 | 1 |
| BAD | 1 | 1 |

Such an assignment is made each time a new bar or space is measured. Should ratio values exceed prescribed tolerances, typically >6 or <1/6, as signaled by the bar and space max/min threshold circuits 3C1, 3C2 and 2C1, 2C2, respectively, a "bad" ratio value indicated by the 11 code is generated. These threshold circuits operate through gating circuit 10 to produce the 11 "bad" character code when measured durations are detected that are based on bars and spaces that are either too wide or too narrow. The accumulated clock counts stored in these threshold circuits are respectively cleared at the end of each scanned bar and space. Gating circuit 10 also guarantees that the data associated with a particular bar (space) ratio is complete by delaying its transmission to shift register 15 until the occurrence of the next space (bar). An end of label signal, generated by end of label circuit 2D, terminates the data stream when a predetermined space count has been exceeded (approx. 0.125" in the scan direction) thus indicating a space larger than a single-character width. Consequently, such a space can appear in the code field at any location.

As the serial data is shifted into shift register 15 with the appearance of each successive set of two bits from gate 10, the output of shift register 15 is transmitted in parallel form to PROM 16 which in turn continually translates the binary data into a seven bit ASCII character format, whenever the bit patterns presented to it can be decoded. PROM 16 then provides each decoded ASCII character to a data multiplexer (MUX) 18 for eventual entry into a first-in first-out (FIFO) computer interface unit 19. As detailed in FIGS. 4A-D, PROM 16 comprises a series of PROM decoders arranged in such a way to provide the flexibility needed to decode either "CODE 39" or "CODABAR" bar code labels ("CODE 39" requires 14 bits whereas "CODABAR" requires 10 bits to represent each ASCII character).

Counting/MUX control logic circuit 17, also detailed in FIGS. 4A-D comprises an array of flip-flop and gating circuits and provides the important function of telling the computer the bar-count basis upon which a scanned bar-coded character has been decoded. Furthermore, it signals the computer whether the next word transmitted to it will be a quasi-identified ASCII character or bar-count data. Circuit 17 transmits a shift-into (SI) signal to FIFO 19 when either an end of label condition, a bar count, or an ASCII character respectively, is ready for transmission into FIFO.

Finally, either "CODE 39" or "CODABAR" formats can be decoded simply by the throw of a switch which changes the count=4 signal to a count=5 signal. Thus by making minor changes to both MUX control logic circuit 17 and decode PROM 16 a variety of bar code formats can be decoded with this invention.

The function of MUX circuit 18 is to transmit to FIFO 19 either a seven bit ASCII decoded character with a flag bit in the eighth position to indicate whether a complete or incomplete bar count was obtained before the last character decode, or a four-bit bar-count number. Upon receipt of an end of label signal MUX 18 generates a set of eight 1-bits to FIFO 19 as a signal to the computer to disregard all succeeding data until the next start-stop code has been identified.

To summarize, the decoding circuit operates in the following manner.

Bar and space data is gated serially into shift register 15 whose parallel output is used to set up the address of PROM 16. When PROM 16 identifies the bit sequence as representing a character (ten bits are needed to completely represent a "CODABAR" code of 4 bars and 3 spaces), it will generate a seven-bit ASCII code corresponding to the identified character and transfer the character code to MUX 18.

Concurrent with the decoding operation, a counter 14 (FIG. 4) in MUX control logic circuit 17, is counting the number of bars occurring since the last character was decoded. Should the instant character be decoded with a bar-count not equal to 4, then a flag bit in the eighth bit position is set in MUX 18 (the character data take up the first seven bit positions). The presence of this flag bit indicates that the next data word to be shifted into MUX 17 is the bar count. Therefore, if a character has been decoded and the bar count is not 4, then the character with the eighth flag bit present will be shifted into FIFO 19 upon the next shift-in (SI) pulse and the bar count data will be transferred on the next following shift-in pulse. If the bar count is 4 and a character has been decoded, then only the decoded character data will be shifted into FIFO 19 since the flag bit is not set. When the end of a label is sensed, which occurs when no bars are detected for 50 μsecs (or 512 counts at a 10 MHz clock rate), all bits are set high in MUX 17 and shifted into FIFO 19.

Computer interface circuit 19 comprises a group of eight First-In First-Out Memories (FIFO) arranged in two groups of four to handle a total of 256, eight-bit words. This storage is ample to enable the interface to serve as an asynchronous buffer between the decoder logic and the computer.

Data is clocked into FIFO with a shift-in (SI) pulse, and, once entered, the data ripples through the memory to the output. The stored words are lined up at the output end of memory in the same order they were written. A shift-out (SO) signal from the computer causes the last data in line to be replaced by the next to last and causes all other data to shift one word-width toward the output.

Several control signals available on FIFO are used to control its operation. A memory-empty signal, generated by FIFO when no data remains to be transferred to the computer, tells the computer that no more data is available for input. An input-ready (IR) signal, generated by FIFO, is used to indicate FIFO's ability to receive more data from MUX 18, when prompted by the occurrence of a shift-into signal (SI) generated by MUX control logic 17. If FIFO is full, no more data will be accepted by FIFO until one-half of the data in memory has been shifted out. A jumper connection enables one to select either ¾ full, ½ or empty memory conditions upon which to base data acceptance levels. All FIFO memories are cleared simultaneously by a computer originated memory-clear signal each time a new label is to be read.

Computer 20 may be either a general purpose computer or a microcomputer, or it may be constructed using RTM or integrated circuit elements. Its main function is to recognize valid characters transmitted by the decoding logic and to check for correct label and character formats.

Figure 4:
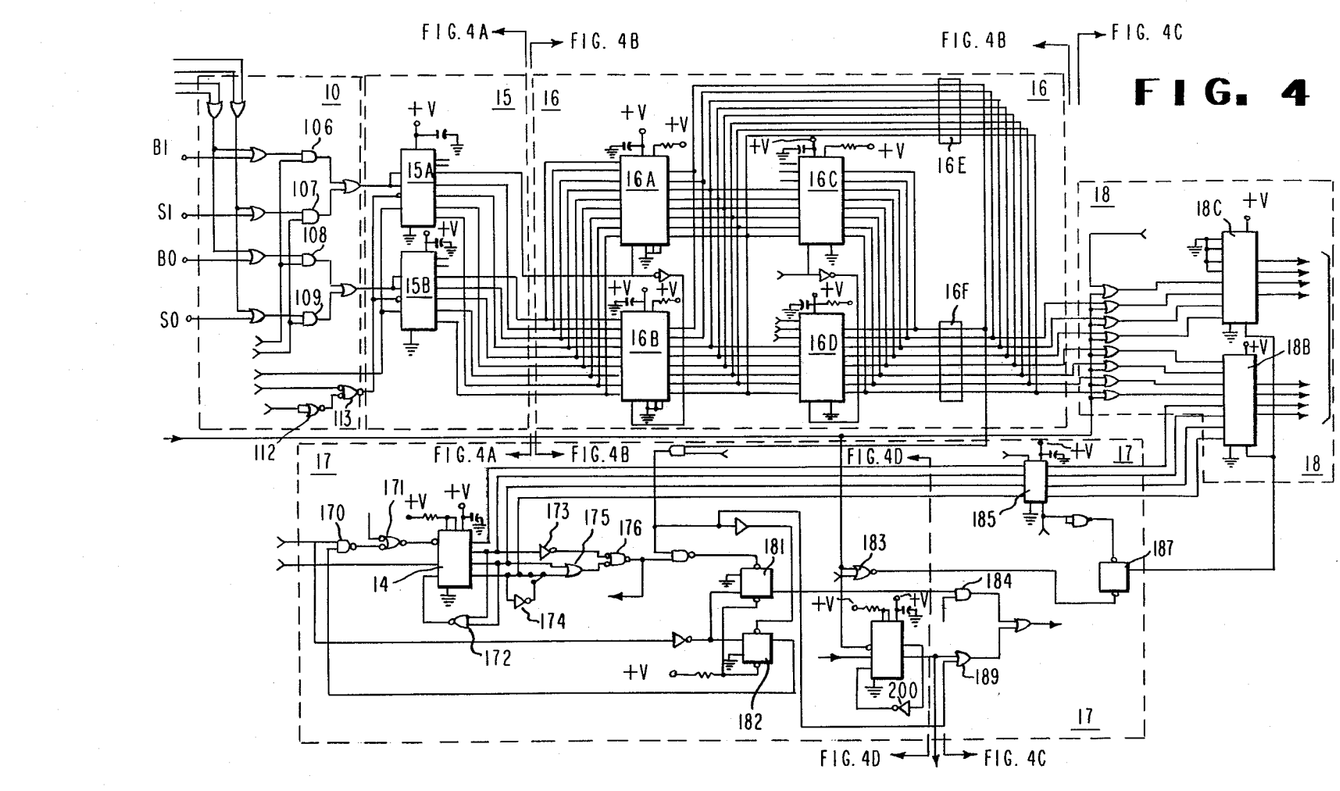
FIG. 4 is a schematic diagram of the basic label reading system.

FIG. 4 is a detailed schematic diagram of the label decoder logic elements comprising gating circuitry 10, shift register 15, decoder PROM 16, counting and MUX control logic 17; and MUX 18. FIGS. 4A, 4B, 4C and 4D are portions of FIG. 4 enlarged to facilitate following the drawing.

Figure 4A:
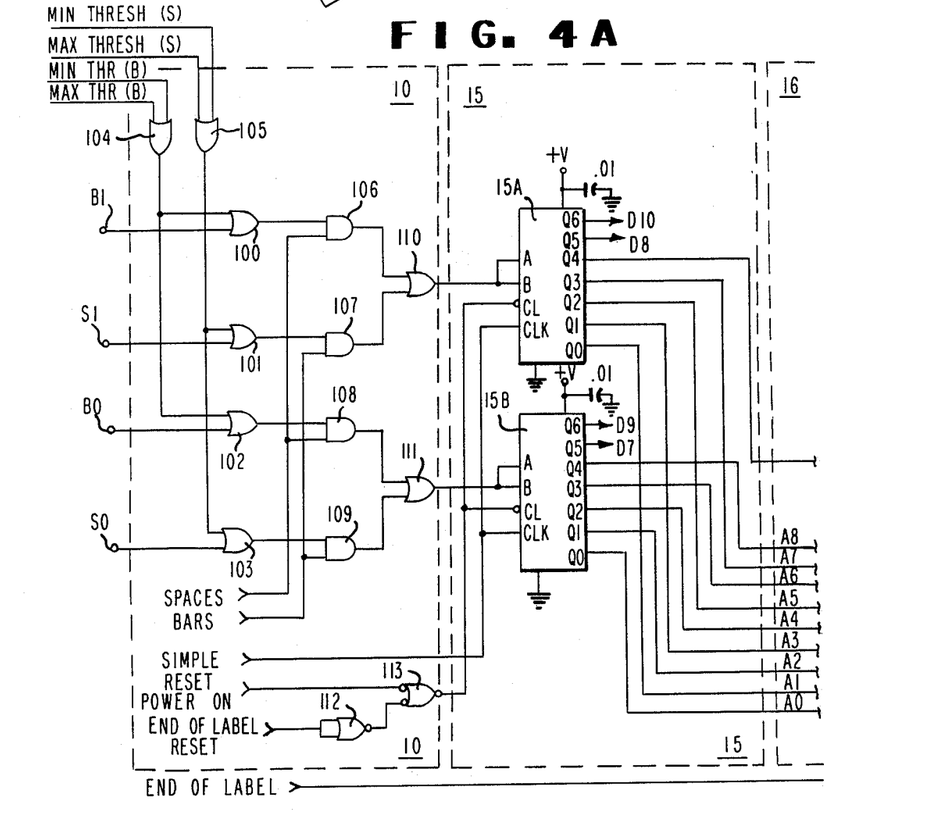
FIGS. 4A, 4B, 4C and 4D represent enlarged portions of FIG. 4.

Referring to FIG. 4A, the binary bar and space ratio code pairs $B_oB_1$ and $S_oS_1$ tabulated above are computed by ROMS 8 and 9 (FIG. 3), and are respectively input to a parallel array of four OR gates 100, 101, 102, 103. These gates are controlled by bar and space maximum and minimum threshold signals via OR gates 104, 105 so that should ratio values exceed prescribed tolerances, typically >6 or <1/6, bar and space max/min threshold circuits 3C1, 3C2 and 2C1, 2C2 (FIG. 3) will cause a pair of binary ones to appear at the respective input terminals of type 74164 shift registers 15A and 15B for recording in PROMS 16A or 16B, respectively. These binary signals plus those related to valid width ratios are transmitted to shift register 15 via AND gates 106, 107, 108, 109 as controlled by the next occurring space (or bar) control signal, respectively. This control signal guarantees that the data associated with a particular bar (space) ratio is complete before it is transferred into shift register 15.

OR gates 110, 111 are used to combine the separate $B_1S_1$ and $B_oS_o$ binary data results for input into respective shift registers 15A and 15B. Registers 15A and 15B form independent data streams from the bar (space) input data pairs as they are sequenced by a "sample" signal. The "sample" signal is obtained from the leading edge of each bar or space signal, as it occurs. An "end of label reset" signal applied to the clear terminals of registers 15A and 15B through OR gates 112 and 113 is generated by the end of label counter 190 of MUX control circuit 17 and terminates the data stream whenever the predetermined space count 512 has been exceeded. It is intended that this signal indicate that a space longer than a single-character width has been traversed by the instant scan.

Figure 4B:
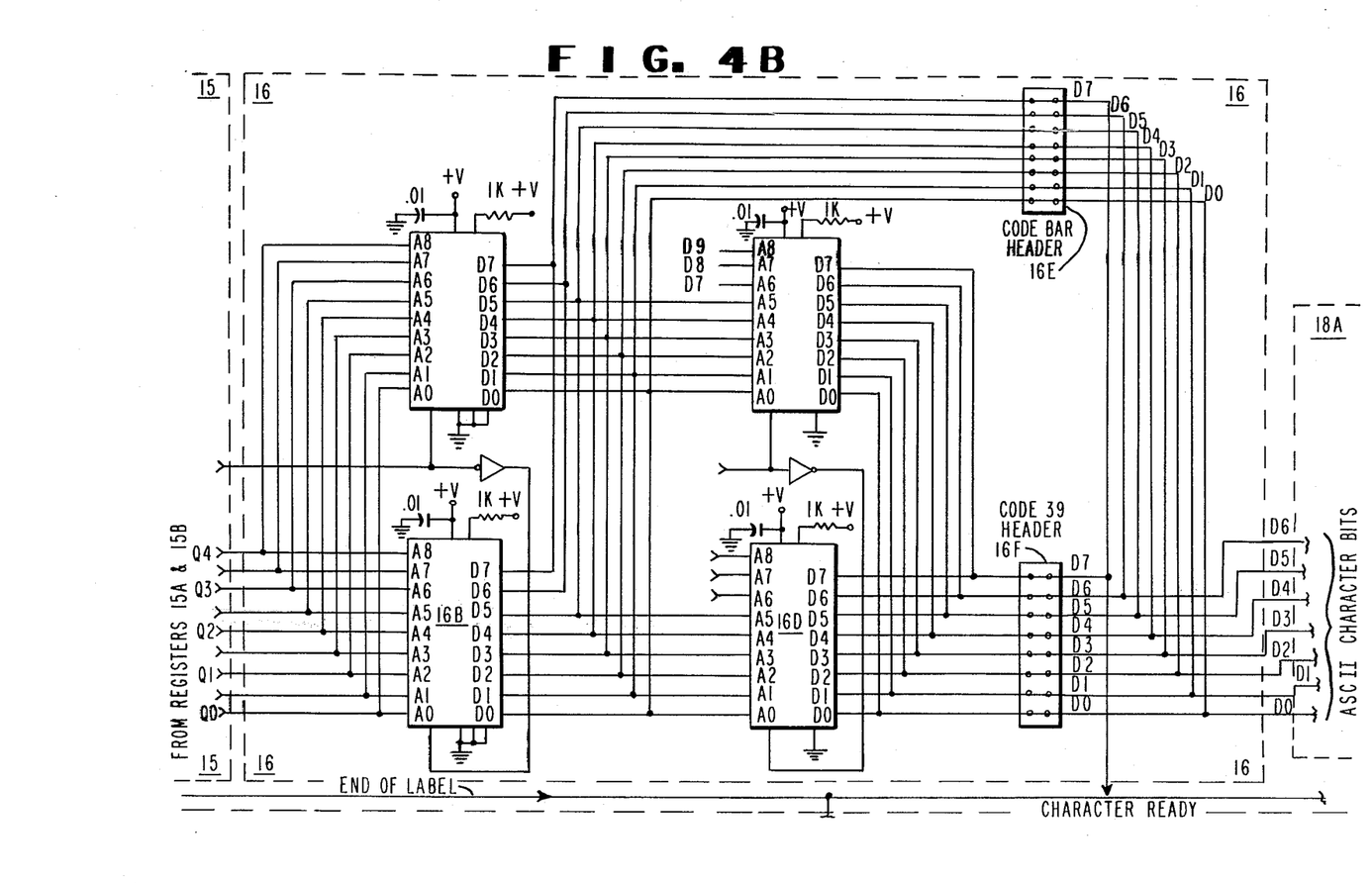

Simultaneously with the sequential input of the two-bit bar and space width ratio values, registers 15A and 15B output ten bits worth of binary data in parallel to character decoders 16A, 16B, 16C, and 16D (FIG. 4B). These decoders are typically INTEL 3624 PROMs which operate to translate the binary data into a seven bit ASCII character format, whenever the shifted input data bit patterns can be decoded. PROM decoders 16A and 16B are programmed individually to enable either one (but not both) to make a ten bit input "CODABAR" character identification as a function of the logic level of the tenth bit transmitted by register 15A. Similarly one of the decoders 16C and 16D, whose data input terminals are connected to the data output terminals of decoders 16A and 16B, provide 14-bit "CODE 39" character identification dependent upon the logic level of the tenth bit transmitted by register 15A.

The four additional input data bits needed to make the "CODE 39" conversion by PROMs 16C and 16D are obtained from the unused data output lines D7, D8, D9 and D10 of shift register 15. Eight-bit headers 16E and 16F are selectively jumpered in order to transmit either "CODABAR" or "CODE 39" decoded ASCII data to data multiplexer 18.

Figure 4C:
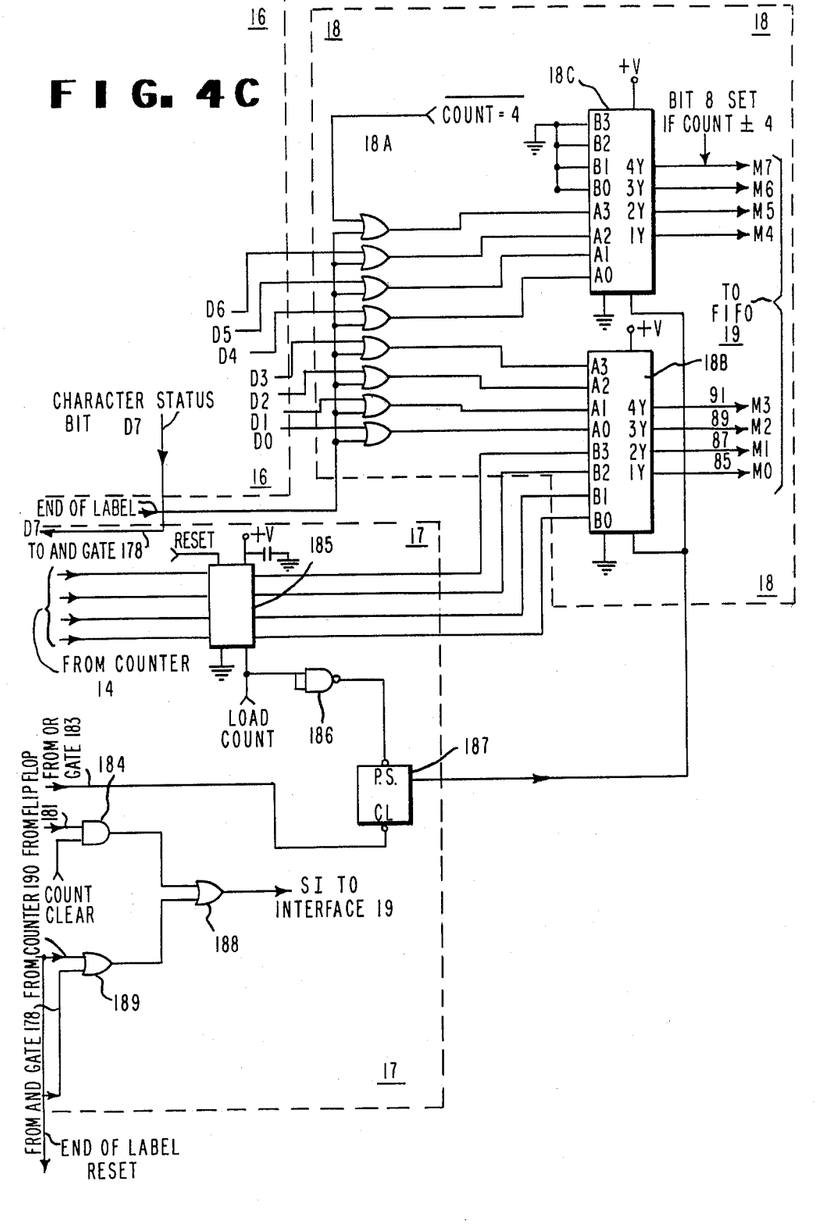

A vital part of the decoder logic circuitry is the data multiplexer (MUX) 18. This circuit ensures that ASCII character data furnished to it from headers 16E or 16F is in proper format to transmit to first-in-first-out (FIFO) computer interface unit 19. FIFO 19 receives either a seven bit ASCII encoded character (with a "character ready" flag bit in the eighth position to indicate whether a complete or incomplete bar count was obtained before the last character decode), a four-bit bar count number, or a set of eight 1-bits upon "end of label" to flag the computer to disregard all succeeding data until the next start-stop code has been read.

MUX 18 (FIG. 4C) comprises the following elements: an array of eight OR gates 18A each having one input terminal connected in common to the "end of label" signal line and the other input terminals connected to the corresponding 8-bit header 16E (16F) output terminals (the eighth bit OR gate is connected to the "count=4" line which originates in the counting-/MUX control logic circuit 17); and two buffer elements, typically type 74157, that receive the OR gate 18A output line plus four additional data lines and a MUX control line from circuit 17, described next.

Counting/MUX control logic circuit 17 (FIG. 4D) comprises an assortment of gates, counters, and flip flops, which together operate (1) to attach bar count data onto the ASCII character information, furnished buffers 18B and 18C, and (2) to control the transmission of data to FIFO as a function of a valid character identification and off-label scan events.

Figure 4D:
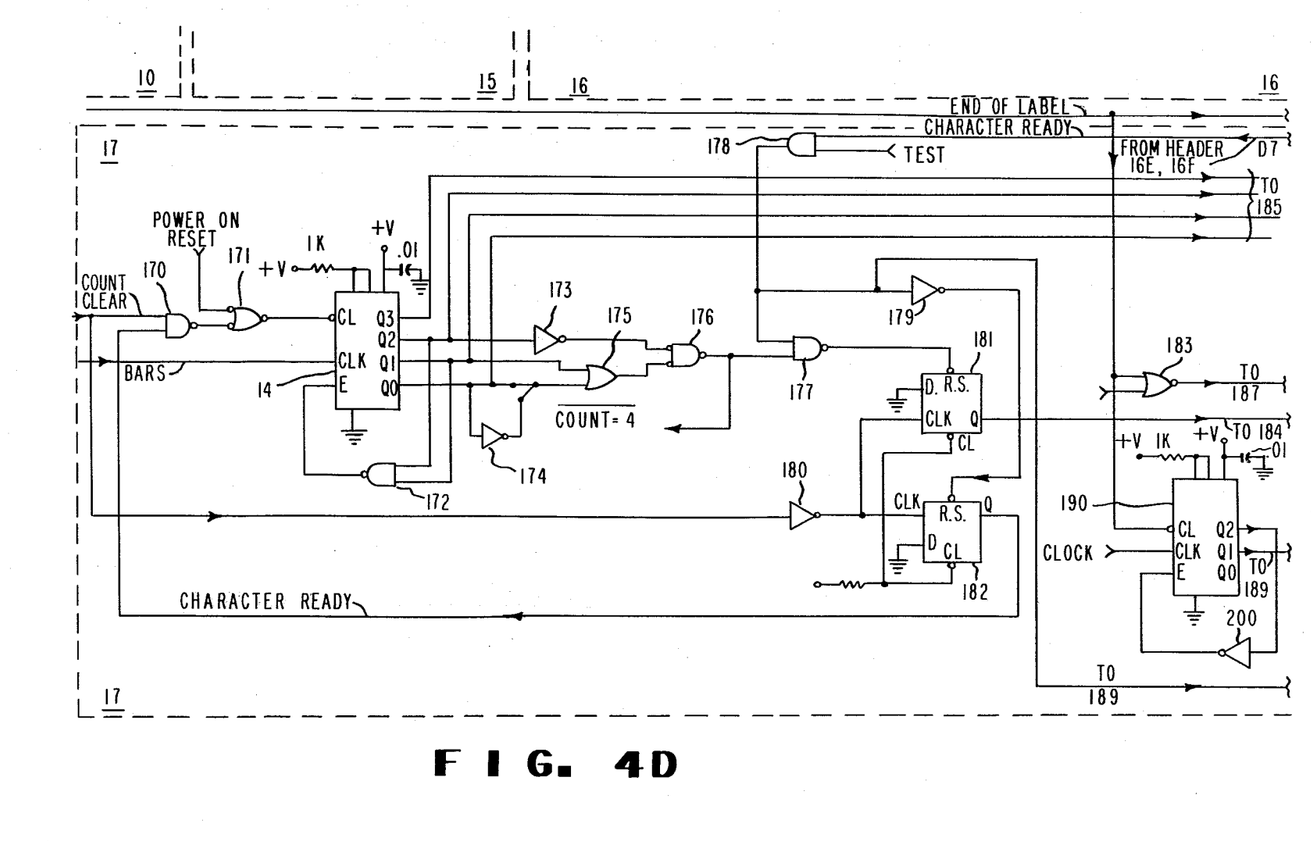

Bar counter 14, typically a type 74161, maintains a continuous count of the bars scanned (no more than seven) or until cleared by a "power-on reset" from timing circuit 1 of FIG. 2 or a "character ready" condition from flip-flop 182 and AND gate 170, whichever occurs first. Note that the "character ready" signal from headers 16E or 16F, which indicates an ASCII character is ready for transfer into MUX 18, is synchronized with a "test" signal via AND gate 178. The "test" signal originates in timing circuit 1 a predetermined number of clock pulses after the occurrence of each bar leading edge. After passing through inverter 179, the "character ready" signal sets flip flop 182, which is cleared momentarily thereafter by "count clear" signal via inverter 180 which in turn operates as the clock signal for both flip flops 181, 182. The "count clear" signal also originates in timing circuit 1. It is based upon the occurrence of respective bar and space leading edges and is generated at least 9 clock periods after their occurrences.

The output terminals of counter 14 are connected to three separate signal paths. The first path connects counter 14 with buffer 18B (FIG. 4C) via control buffer 185, typically a type 74174. Buffer 185 transmits its contents upon a "load count" command. This signal originates in timing circuit 1 upon the occurrences of each scanned bar and space. The "load count" signal also toggles flip flop 187, being reset by successive "sample" pulses or "end of label" pulses, whichever occurs first via OR gate 183. This toggle signal controls the rate at which the seven ASCII character bits plus the character status bit appear at the output terminals $M_o$-$M_7$ of buffers 18B and 18C.

The second output data path from counter 14, is used to disable the counter after a count of 6, whereby NAND gate 172 monitors the second and third output bit positions to produce the required disable signal.

The third output data path from counter 14 is used to generate a "count=4" signal and a "shift into (SI)" pulse used by FIFO 19 to enter into FIFO registers, the data appearing on the $M_o$-$M_7$ output terminals of buffers 18B and 18C, respectively.

The following table lists the output logic level state of AND gate 176 as a function of count and the code used:

| COUNT | $Q_2$ $Q_1$ $Q_0$ | "CODABAR" COUNT = 4 | "CODE 39" COUNT = 5 |
|---|---|---|---|
| 0 | 0 0 0 | 1 | 1 |
| 1 | 0 1 0 | 1 | 1 |
| 2 | 1 0 0 | 1 | 1 |
| 3 | 1 1 1 | 1 | 1 |
| 4 | 0 0 1 | 0 | 1 |
| 5 | 0 1 1 | 1 | 0 |
| 6 | 1 0 1 | 1 | 1 |
| 7 | 1 1 1 | 1 | 1 |

Inverter 174 is switched into one of the input lines to OR gate 175 for "CODE 39", but is not used at all for "CODABAR". Inverter 173 connects terminal $Q_2$ of counter 14 with AND gate 176. From the above table, it is obvious that AND gate 177 passes all character ready pulses except those that are associated with a count=4 for "CODABAR" or a count=5 for "CODE 39". Consequently, the Q output terminal of flip-flop 181, which has its set terminal connected to the output of AND gate 177, remains at a logic high level, thus enabling the "count clear" signal to generate a "shift into" pulse via AND gate 184 and OR gate 188.

A "shift into" signal is generated also upon a delayed "end of label" condition by means of three-bit counter 190 via OR gates 188 and 189. Inverter 200 connected between the $Q_2$ and enable (E) terminals stops the count at the eighth time period in each scanned bar or space. The "shift into" signal is also used as an "end of label" reset to clear shift registers 15A and 15B.

The Label-Reading Algorithms

Figures 5A, 5B:
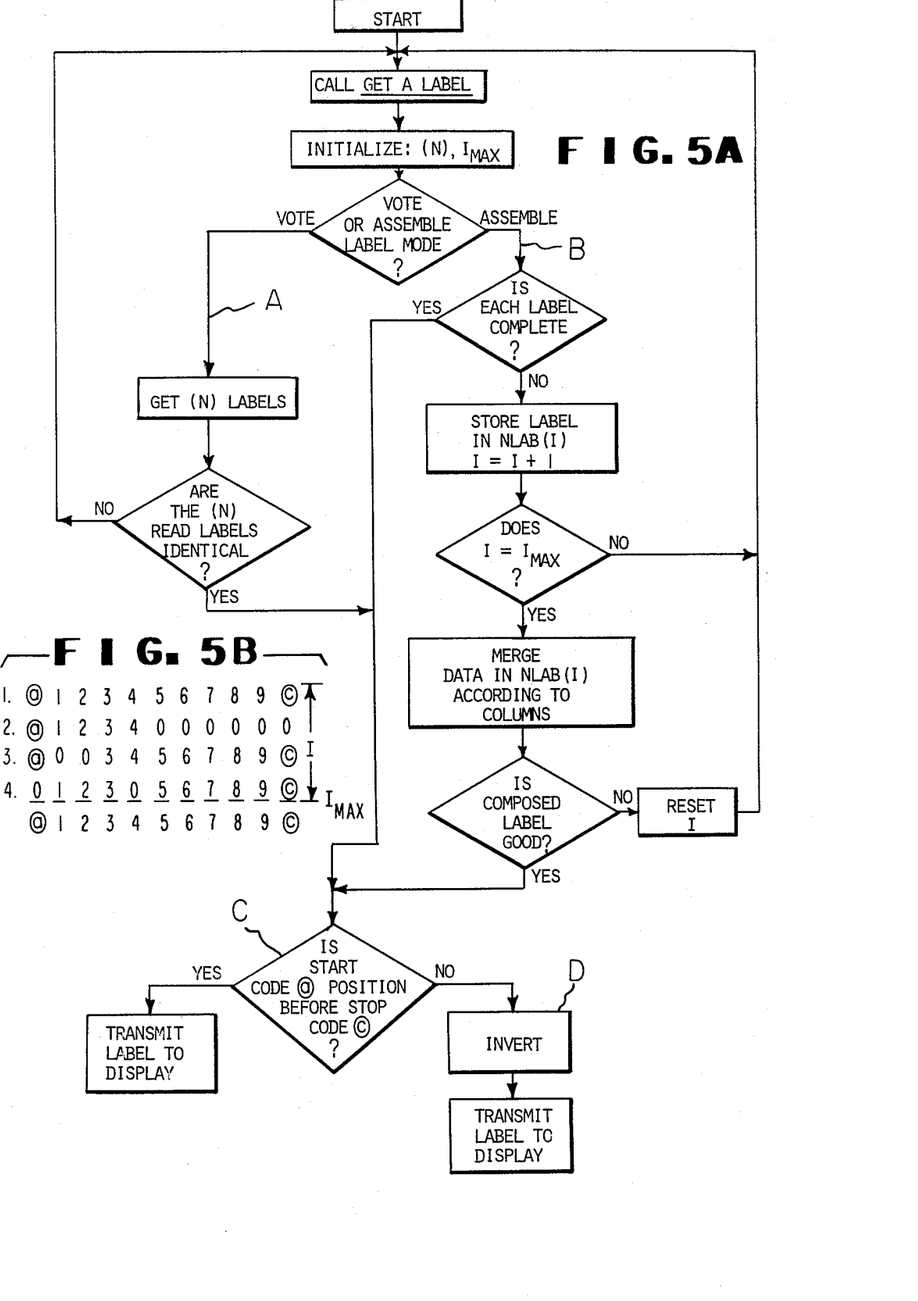
FIG. 5A is the algorithm for assembling label composing routines.
FIG. 5B is a typical NLAB(I) matrix.

FIG. 5A is a flow diagram which details the algorithm used to convert the string of decoded characters, generated in the course of each scan, into a label format. At the outset of this procedure, the "Get a Label" routine is followed. This algorithm, detailed in FIGS. 6A through 6C, screens the character data such that essentially only valid-identified characters are considered by the algorithm of FIG. 5A.

Figure 6A:
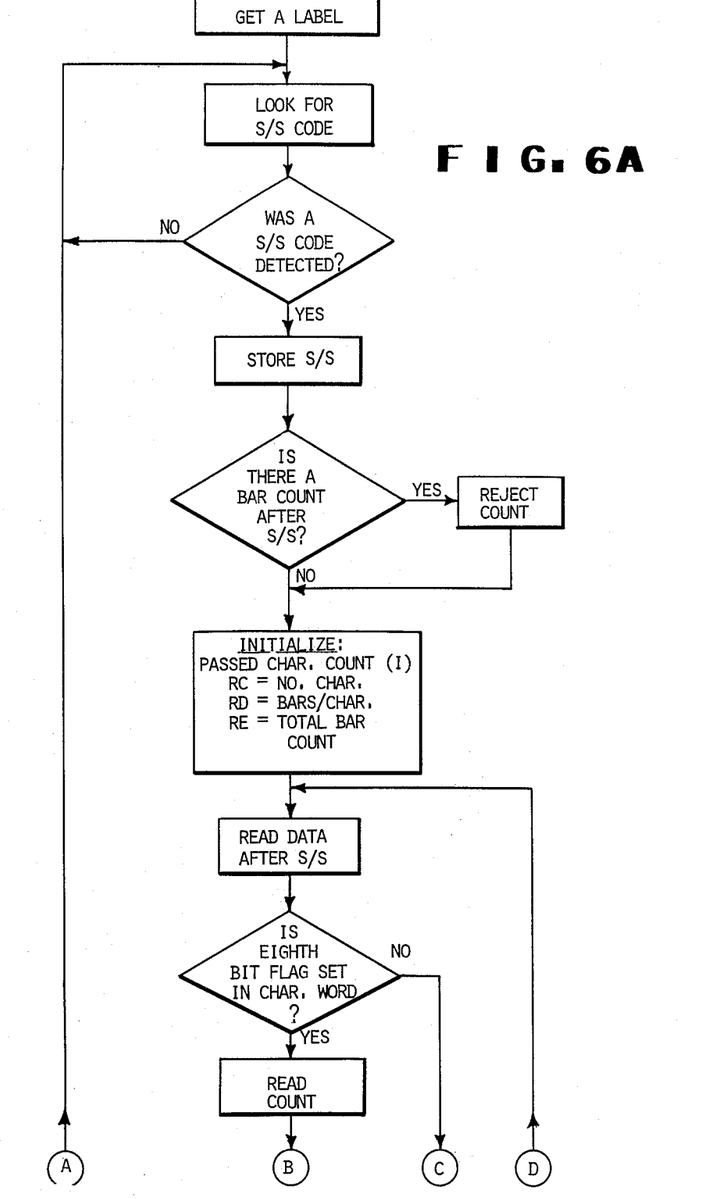
FIGS. 6A, 6B and 6C are flow diagrams detailing the character label reading subroutines.

Turning to FIG. 6A, the first requirement to be satisfied is to determine whether either a start or a stop (S/S) code was scanned; if a S/S was not detected, succeeding scans are disregarded until a detection is obtained. Once detected, the code(s) are stored in appropriate register locations and any bar-count data present at the time of the start code decode is ignored to reduce the possibility of reading data carried over from a previous label scan.

After initializing passed-character count (I), the number of characters in the label (RC), the number of bars/character (RD), and the total bar-count of the label (RE), the computer reads the 7-bit ASCII character data furnished by the FIFO 19.

Figure 6B:
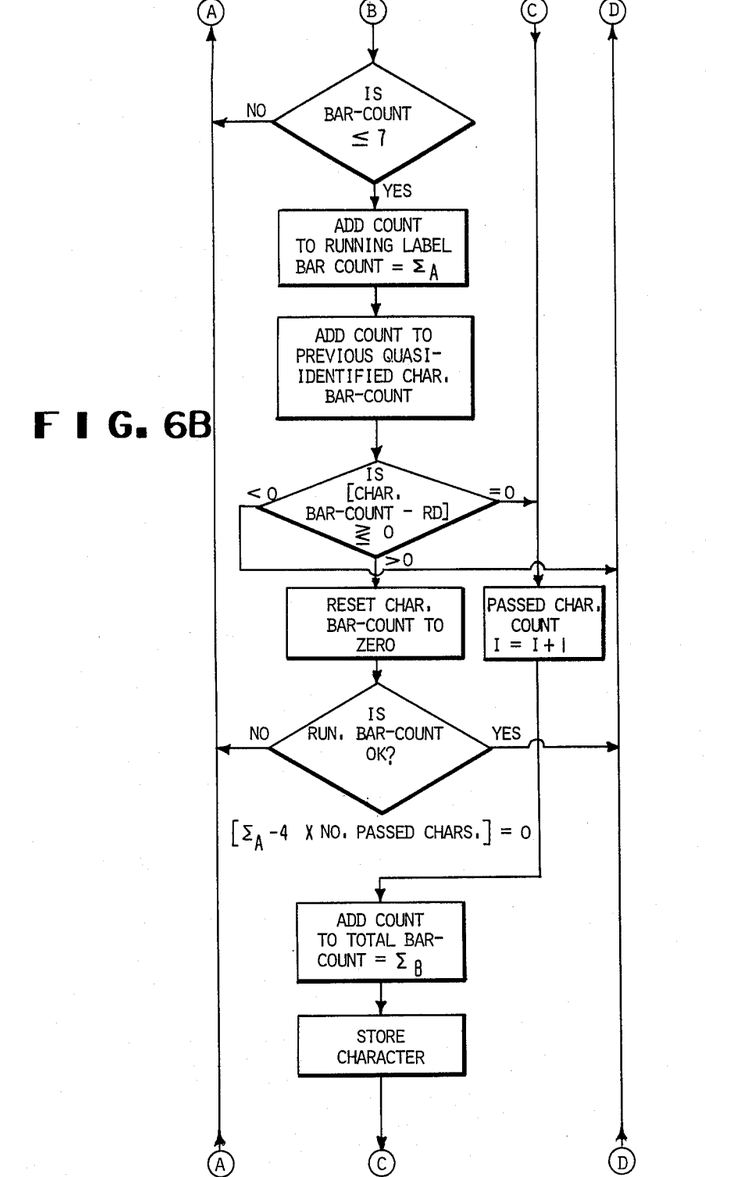

Providing the data has passed the above criteria, the eighth bit flag of the character word, is read. Should this flag be set, the character bar-count associated with this flag is recorded. For "CODABAR," as many as seven bar-counts can be added to both the running label bar-count, $\Sigma_A$, and the quasi-identified character bar-count. Should the total character bar-count exceed RD, the character bar-counter is reset to zero and a determination is next made whether the running bar count $\Sigma_a$ exceeds 4 times the number of characters passed so far. (A passed-character is one having a character bar-count=4). If more bars are present than should be present at this stage of the scan, the entire label is rejected and another scan must be read. Otherwise, the next character in the label will be evaluated.

In the event a character has been quasi-identified with a character bar-count of less than RD, continued attempts are made to obtain a satisfactory decode with a total "CODABAR" character bar-count=4. If the reader successfully identifies it as a valid character, it is stored, the passed-character counter is incremented by one, and the passed-character bar-count is added to $\Sigma_B$. A check is made whether the number of passed-characters, I, matches the predetermined number of characters in the label (RC) before the stored characters are read out. If I is less than RC, more scan data is read.

Figure 6C:
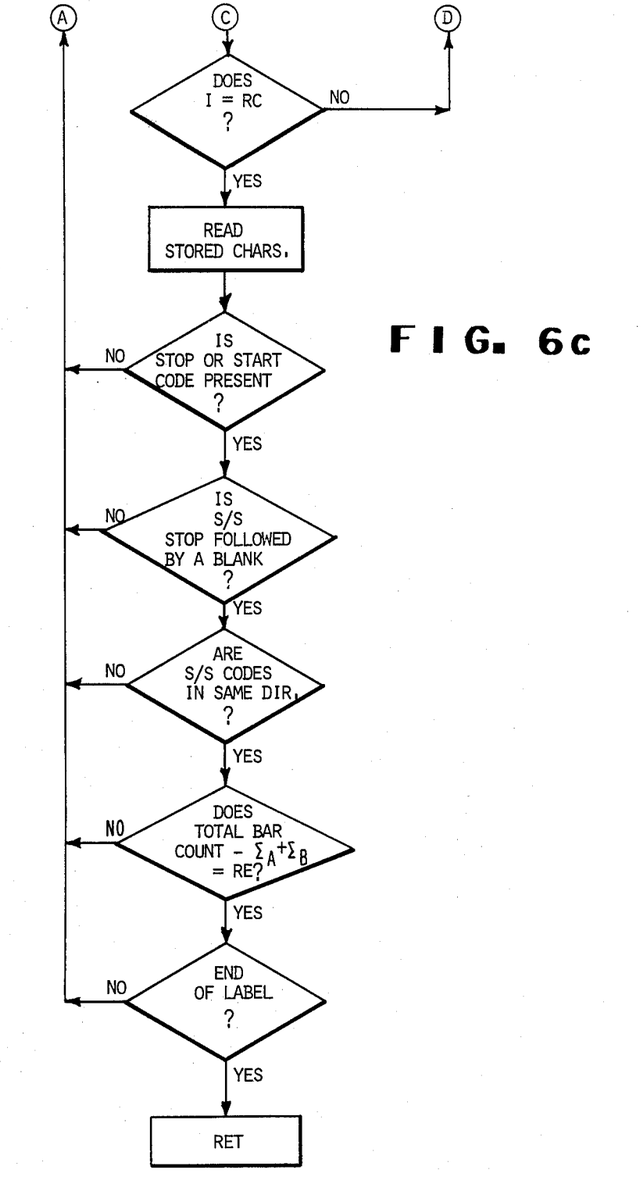

The last set of steps in the character identification algorithm of FIG. 6C do the following:
1. Check to ensure either a stop or a start code or both are present in the string of stored characters.
2. Ensure that each S/S stop code is followed by a blank.
3. Check that both start and stop codes are oriented in the same direction.
4. Ensure that the total bar count $\Sigma_A + \Sigma_B = RE$, as specified, and
5. That an end of label condition has occurred.

Returning to FIG. 5A, after specifying the predetermined number (N) of labels to be "voted" and the number ($I_{max}$) of labels to be assembled, one of the following two procedures may be applied:

A. A series of (N) label good reads are sequentially stored, N being typically less than ten and normally two. The "voting" requirement imposed is that each respective character in a good label read be identical to the one preceding it in the same line location. If a "voting" test fails, another series of (N) good reads is taken until a set of N identical character strings is recorded for the label.

B. For poorly printed labels, the assemble procedure is used. This routine makes it possible to analyze a series of incomplete scans such as shown in the NLAB (I) matrix of FIG. 5B. Although the individual columns in the NLAB (I) Matrix may contain invalid or missing characters, this does not necessarily mean that the assembled character data after $I_{max}$ scans (typically less than ten, but=4 in FIG. 5B) would disqualify the label completely. The question "is the composed label good?" is answered based on whether a predetermined statistical accuracy criterion has been met; for example, are at least 75% of the characters in each column the same? Using this routine, it is possible to read labels when one or more scans have failed to detect either the stop or start characters.

The final step in the label-read algorithm is to determine whether the label was read in a forward or a reverse direction. By means of a ROM lookup table for example, the reversed character data can be converted to normal order before it is transmitted to display printer 21 (FIG. 3).

For applications using a reciprocating scanner, the decision block C and the action block D is removed from the bottom of the flow chart and placed in positions "A" and "B", respectively, in order that the read label is processed in its non-inverted form. The final step remains "transmit label for display."

In summary, the flow diagrams show that a validated and complete label will be displayed by printer 21, only if it meets all of the following conditions:
1. Valid start and stop (S/S) characters were scanned at least once.
2. The correct number of characters between the start/stop characters have been decoded.
3. The stop character is immediately followed by a blank (FF).
4. The total number of bars detected agrees with the predetermined label bar-count.
5. No embedded start/stop codes or invalid ASCII characters between the start/stop characters were detected.
6. The start/stop characters must both be oriented in the same scan direction.

The computer algorithm guards against multiple re-reading of the results of a single scan across the label and reading labels in the reverse direction.

Binary switches may be used to input the following reference data for the computer algorithms:
1. Label length [1–32 characters excluding stop and start characters=(RC) with total bar-count=(RE)].
2. Code selection ["CODABAR" "CODE 39" bars/-character=(RD)].
3. Assemble label mode (multiple incomplete scans=$I_{max}$).
4. Message reading redundancy mode (voting and accepting according to specified number N apparently good labels read).

We claim:
1. A method for decoding bar-coded labels comprising: computing separate ratios between adjacent bars and between adjacent spaces from an input data stream of bars and spaces; assigning a two-bit binary code to each computed ratio in order to classify it as a greater than, less than, equal to or erroneous relation; decoding the resultant string of binary bits of the classified ratios into corresponding tentative character identifications using associated bar count data; and assembling the tentative character identifications into a most likely to have occurred character set.

2. The method as defined in claim 1 wherein computing separate ratios comprises counting the clock pulses of successive bar and space widths then converting count values into log values instantaneously and subtracting successive log values of said adjacent bars and successive log values of said adjacent spaces to obtain said ratios.

3. The method of claim 2 wherein assigning a two-bit binary code to each computed ratio comprises comparing the ratio values with predetermined limits and assigning two-bit value weights of 10 for ratios greater than 1, of 01 for ratios less than 1, of 00 for a ratio of 1 and of 11 for erroneous ratio.

* * * * *